United States Patent [19]

Bolin

[11] 4,088,826

[45] May 9, 1978

[54] GAS-INSULATED ELECTRICAL APPARATUS WITH FIELD-INSTALLABLE PARTICLE TRAPS

[75] Inventor: Philip C. Bolin, West Borough, Mass.

[73] Assignee: Westinghouse Electric Corp., Pittsburgh, Pa.

[21] Appl. No.: 796,577

[22] Filed: May 13, 1977

[51] Int. Cl.² .............................................. H01B 9/06
[52] U.S. Cl. ............................... 174/14 R; 174/16 B; 174/28
[58] Field of Search ...................... 174/14 R, 16 B, 28, 174/29, 99 B

[56] References Cited

U.S. PATENT DOCUMENTS

| | | | |
|---|---|---|---|
| 3,515,939 | 6/1970 | Trump | 174/14 R X |
| 3,767,837 | 10/1973 | Graybill | 174/16 B X |
| 3,864,507 | 2/1975 | Fox et al. | 174/14 R |
| 3,898,367 | 8/1975 | Nakata | 174/14 R |
| 4,029,890 | 6/1977 | Nakata | 174/14 R |
| 4,029,891 | 6/1977 | Nakata | 174/14 R |
| 4,029,892 | 6/1977 | Nakata | 174/14 R |
| 4,034,147 | 7/1977 | Clark et al. | 174/14 R |
| 4,042,774 | 8/1977 | Nakata et al. | 174/14 R |

*Primary Examiner*—Arthur T. Grimley
*Attorney, Agent, or Firm*—M. S. Yatsko

[57] ABSTRACT

A gas-insulated transmission line including an elongated cylindrical outer sheath and an elongated cylindrical inner conductor disposed within the outer sheath. An insulating gas is disposed within the outer sheath for insulating the inner conductor from the outer sheath, and means are included for insulatively supporting the inner conductor within the outer sheath. Means for trapping particles which may be present within the outer sheath are included, and comprise a base member secured to the outer sheath about the periphery of an opening which is cut within the outer sheath, a mounting member secured to the base member and directed towards the inner conductor, and a trapping member fixedly secured to the mounting member.

10 Claims, 3 Drawing Figures

U.S. Patent    May 9, 1978    4,088,826
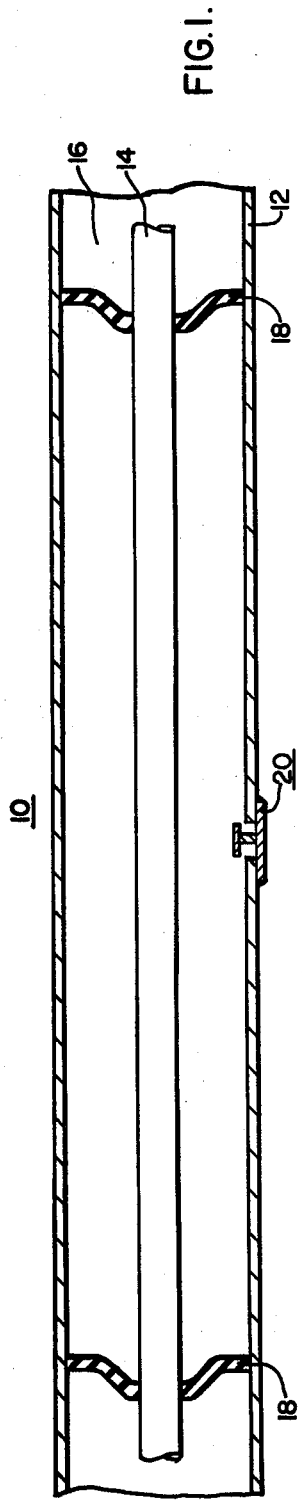
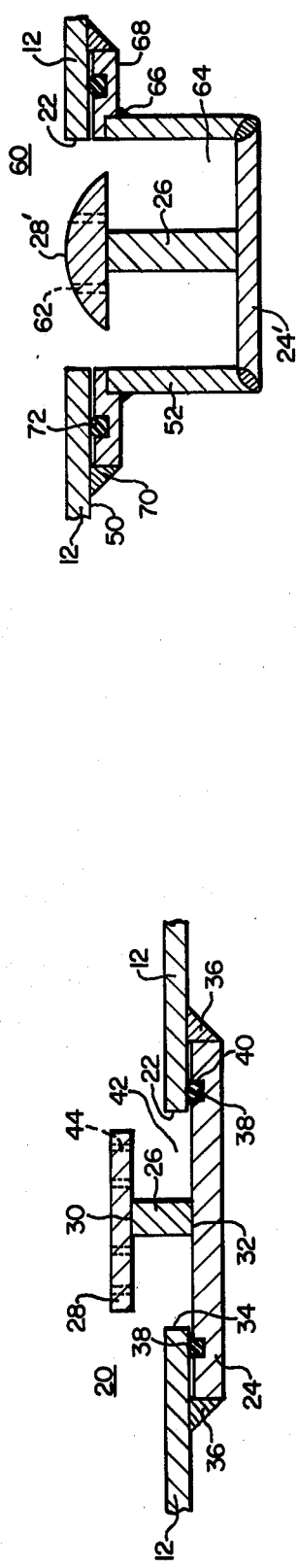
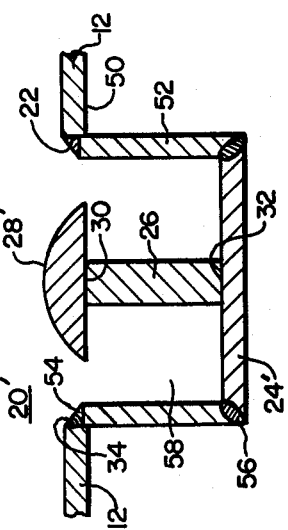

GAS-INSULATED ELECTRICAL APPARATUS WITH FIELD-INSTALLABLE PARTICLE TRAPS

BACKGROUND OF THE INVENTION

This invention relates generally to gas-insulated electrical apparatus and more particularly to a gas-insulated transmission line having a particle trap which may be field installed.

Gas-insulated transmission lines are being used on an ever increasing scale in recent years due to the desirability of increasing safety, problems in acquiring right-of-way for overhead lines, and high power lines required by growing metropolitan areas and the growing demands for electrical energy. Gas-insulated transmission lines typically comprise a hollow sheath, a conductor disposed within the sheath, a plurality of solid insulating spacers which supports the conductor within the sheath, and a compressed gas such as sulfur hexafluoride disposed within the sheath to electrically insulate the conductor from the sheath. The typical assembly has been fabricated from relatively short sections of hollow cylindrical ducts or tubes in which the conductor and insulators are inserted. This assembly is usually completed in the factory, and the sections are welded or otherwise secured together in the field to form the transmission line. Gas barriers may be provided at intervals along the length of the assembly, and, after evacuation of the line, the insulating gas is forced into the sheath under pressure.

One problem occurring in the use of gas-insulated transmission lines concerns the mobile conducting or semiconducting particle. These particles, which may enter the line during the fabrication of the line during installation in the field, cause problems in that they may lower the dielectric strength of the insulating gas and may initiate flashover and breakdown of the gas as they travel between the outer sheath and the inner conductor. Trump, in U.S. Pat. No. 3,515,939, disclosed a means for deactivating and eliminating the deleterious effects of such conducting particles. In that patent, Trump describes the use of electrodes placed inside the outer sheath to create low field regions which trap and deactivate the particles. Whenever a particle enters the low field region, it cannot acquire enough force to propel it out of the region, and thus it is trapped in the low field region so that it cannot initiate breakdown of the line.

However, the use of the particle trapping region as taught by Trump has not always occurred. Indeed, the majority of the gas-insulated transmission lines installed in this decade have been installed without such particle trapping regions. It is only within the recent past that the magnitude of the problem caused by the conducting particles has been appreciated. As such, there are numerous installations of gas-insulated transmission lines which do not contain such particle traps, or which contain an inadequate number of traps, and it is not unknown for these lines to flashover or breakdown due to the presence of the particles. Therefore, it is desirable that some means be provided for installing particle traps in these previously-installed transmission lines, and these particle traps should be capable of being installed in the field.

SUMMARY OF THE INVENTION

In accordance with this invention, it has been found that a more desirable gas-insulated transmission line is provided which comprises an elongated cylindrical outer sheath having a radial opening therein, an elongated inner conductor disposed within the outer sheath, means for insulatively supporting the inner conductor within the outer sheath, and an insulating gas electrically insulating the inner conductor from the outer sheath. Means for trapping particles present within the outer sheath are included, which particle trapping means are capable of being installed in the field, and comprises a base member sealing secured to the outer sheath adjacent the periphery of the outer sheath opening, a mounting member secured to the base member and directed radially inwardly toward the inner conductor, and a trap member fixedly secured to the mounting member.

BRIEF DESCRIPTION OF THE DRAWINGS

Reference is now made to the description of the preferred embodiment, illustrated in the accompanying drawings, in which:

FIG. 1 is an elevational, sectional view of a gas-insulated transmission line utilizing the teachings of this invention;

FIG. 2 is a detailed view of the particle trapping means of FIG. 1;

FIG. 3 is a modification of the particle trapping means of FIG. 2; and

FIG. 4 is a modification of the particle trapping means illustrated in FIGS. 2 and 3.

DESCRIPTION OF THE PREFERRED EMBODIMENT

Referring now to FIG. 1, therein is illustrated a gas-insulated transmission line 10 utilizing the teachings of this invention. Although described with respect to a transmission line, the invention is also applicable to other gas-insulated equipment, such as circuit breakers and switches, for example. The transmission line 10 comprises a generally elongated, cylindrical outer sheath 12, typically at ground potential, a generally elongated inner conductor 14 disposed within the outer sheath 12, and at a high electrical potential with respect thereto, and an insulating gas indicated generally at 16 disposed within the outer sheath 12 and electrically insulating the inner conductor 14 from the outer sheath 12. Also included are support means 18 for insulatively supporting the inner conductor 14 within the outer sheath 12. As shown, particle trapping means 20 are included for trapping and deactivating any particles which may be present within the outer sheath 12 and disposed in the insulating gas 16.

In the detail view of the particle trapping means 20 illustrated in FIG. 2, it can be seen that a generally cylindrical radial opening 22 is cut within the outer sheath 12, preferably in the vertically lowermost portion of the outer sheath 12. It is through the opening 22 that the particle trapping means 20 are inserted to within the outer sheath 12. As shown, the particle trapping means 20 comprises a base member 24, a mounting member 26, and a trap member 28. The base member 24, the mounting member 26, and the trap member 28 should be of an electrically conducting material such as aluminum, as is the outer sheath 12. The trap member 28 is fixedly secured to one end 30 of the mounting member 26, and the other end 32 of the mounting member 26 is fixedly secured to the base member 24. One manner of securing these elements together is, for example, by welding. The base member 24 is of a size greater than the size of the opening 22, such that the base member 24 overlaps onto the outer sheath 12. The base member 24 is then sealingly secured to the outer sheath 12 at the periphery 34 of the sheath opening 22 by means such as the welds 36. The base member 24 is sealingly secured to the outer sheath 12 so as to prevent the escape of the insulating gas 16, which typically is sulfur hexafluoride, from within the outer sheath 12. If desired, O-rings 38 may be inserted into slots 40 within the base member 24 so as to prevent any weld splatter from the welds 36 from entering the interior of the outer sheath 12. Also, to facilitate the entrance of conducting or semiconducting particles into the low field region 42 provided between the outer sheath 12, base member 24, and the trap member 28, a plurality of openings 44 may be disposed through the trap member 28. The mounting member 26 is directed radially inwardly towards the inner conductor 14, and, as can be seen, the trap member 28 extends inwardly within the outer sheath 12.

As is apparent, the particle trapping means 20 illustrated in FIG. 2 is capable of being installed within the gas-insulated transmission line 10 once the transmission line 10 has been installed in the field. It may also be utilized for backfitting transmission lines which previously did not have particle trapping means. Such backfitting can be accomplished in a simple and economical manner. The opening 22 can be cut within the outer sheath 12. For ease of operation, the preferable configuration of the opening is circular. The trap member 28, meanwhile, can be secured to the mounting member 26, and the mounting member 26 can be secured to the base member 24. Once the opening 26 is formed within the outer sheath 12, the trap member is inserted through the opening 22 to within the outer sheath, and the base member 24 is positioned adjacent the periphery 34 of the opening 22. The base member 24 is then sealingly secured to the outer sheath 12 such as, for example, by welds 36. The installation of the particle trapping means 20 is then complete, and, upon energization of the line 10, the particle trapping means 20 will function to trap and deactivate any conducting or semiconducting particles which may be present within the outer sheath 12.

A modification of the particle trapping means 20 is shown in FIG. 3. In this Figure, the outer sheath 12, opening 22 therein, and the mounting member 26 are as previously described. However, in this instance, the base member 24' is of a circular shape, and is radially spaced apart from the exterior side 50 of the outer sheath 12. A generally cylindrical side wall member 52 is sealingly secured to both the outer sheath 12 and the base member 24' by, for example, welds 54 and 56, respectively. The trap member 28' is of a generally semicircular shape, so that any particles which may strike the trap member 28' will slide down it into the low field region 58 formed between the side wall member 52 and the base member 24'. If desired, although not illustrated in FIG. 3, openings may be provided within the trap member 28'. In this modification, the installation of the particle trapping means 22' proceeds generally as heretofore described, with certain modifications. The opening 22 is cut within the outer sheath 12, and at the same time the mounting member 26 is secured to both the trap member 28' and the base member 24'. The cylindrical side wall member 52 is disposed within the opening 22 and is sealingly secured along the periphery 34 of the outer sheath opening 22 by means such as the welds 54. The trap member 28' is inserted through the opening 22, until the base member 24' contacts the side wall members 52. The base member 24' is then sealingly secured to the side wall member 52 by means such as the welds 56. This modification illustrated in FIG. 3 is especially useful for gasinsulated transmission lines 10 which are carrying a DC current, where the reduction in field strength within the low field region 58 should be greater than would be the case if the inner conductor 14 were carrying alternating current.

FIG. 4 illustrates a particle trapping means 60 which combines features illustrated in both FIGS. 2 and 3. In the modification shown in FIG. 4, the base member 24', the mounting member 26, and the trap member 28' are as described with respect to FIG. 3. Additionally, openings 62 are provided within the trap member 28' to facilitate the entry of conducting or semiconducting particles into the low field region 64. Also, the side wall member 52 is as previously described, although it is not secured directly to the periphery 34 of the opening 22, but instead is sealingly secured, by means such as the weld 66, to a patch member 68. The patch member 68 is similar to the base member 24 illustrated in FIG. 2, in that the patch member 68 is larger than the opening 22, and is sealingly secured to the exterior side 50 of the outer sheath 12 by means such as the welds 70. Additionally, the O-rings 72 may be provided to prohibit the entry of weld material within the outer sheath 12. The installation of this trap proceeds generally as follows. The trap member 28', the mounting member 26 and the base member 24' are secured together, and the base member 24 is secured to the side wall member 52. The side wall member 52 is then sealingly secured to the patch member 68, and the patch member is then positioned adjacent the opening 22, with the trap member 28 extending toward the inner conductor 12. The patch member 68 is then sealingly secured to the exterior 50 of the outer sheath 12 by means such as the welds 70, and the installation is complete.

Thus, as can be seen, this invention provides a means for installing low field, particle trapping regions in gas-insulated transmission lines where desired, which installation can proceed in the field to minimize the cost of modifying such transmission lines.

I claim as my invention:

1. A gas-insulated transmission line comprising:
    an elongated cylindrical outer sheath having an opening therein;
    an elongated cylindrical inner conductor disposed within said outer sheath;
    an insulating gas disposed within said outer sheath and electrically insulating said inner conductor from said outer sheath;
    means for insulatably supporting said inner conductor within said outer sheath; and
    means for trapping particles present within said outer sheath comprising:
        a base member sealingly secured to said outer sheath adjacent the periphery of said outer sheath opening;
        a mounting member fixedly secured to said base member and directed inwardly towards said inner conductor; and
        a trap member of a size smaller than said outer sheath opening fixedly secured to said mounting member.

2. The gas-insulated transmission line according to claim 1, wherein said trap member has a plurality of openings therein.

3. The gas-insulated transmission line according to claim 1, wherein said mounting member extends from said base member to said outer sheath, and said trap member extends inwardly to within said outer sheath.

4. The gas-insulated transmission line according to claim 1, wherein said trap member is of a semicircular shape.

5. The gas-insulated transmission line according to claim 1, wherein said base member is of a size larger than said outer sheath opening, said base member being secured to the exterior of said outer sheath.

6. The gas-insulated transmission line according to claim 1, wherein said base member is radially spaced apart from the exterior of said outer sheath, and a side wall member is sealingly secured to said base member and to said outer sheath.

7. The gas-insulated transmission line according to claim 6, wherein said outer sheath opening is circular, said base member is circular, and said side wall member is cylindrical, said base member being secured to one end of said side wall member, said side wall member being disposed within said outer sheath opening and secured to said outer sheath along the periphery of said outer sheath opening.

8. The gas-insulated transmission line according to claim 1, wherein said outer sheath opening is in the vertically lowermost portion of said outer sheath.

9. The gas-insulated transmission line according to claim 1, wherein said outer sheath is at ground potential and said insulating gas is sulfur hexafluoride.

10. Gas-insulated electrical apparatus comprising:
    an elongated outer enclosure having an opening therein;
    an elongated inner electrode disposed within said outer enclosure;
    an insulating gas disposed within said outer enclosure and electrically insulating said inner electrode from said outer enclosure;
    means for insulatably supporting said inner electrode within said outer enclosure; and
    means for trapping particles present within said outer enclosure comprising:
      a base member sealingly secured to said outer enclosure adjacent the periphery of said outer enclosure opening;
      a mounting member fixedly secured to said base member and directed inwardly towards said inner electrode; and
      a trap member of a size smaller than said outer enclosure opening fixedly secured to said mounting member.

* * * * *